Feb. 13, 1973  D. R. BROWN ET AL  3,715,786
METHODS AND APPARATUS FOR INCREASING THE
CAPACITANCE VALUE OF A CAPACITOR
Filed May 12, 1971
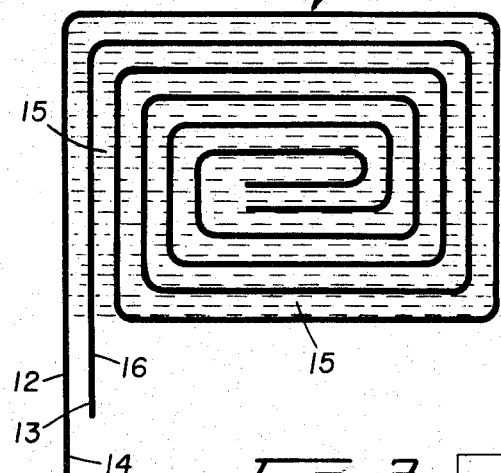
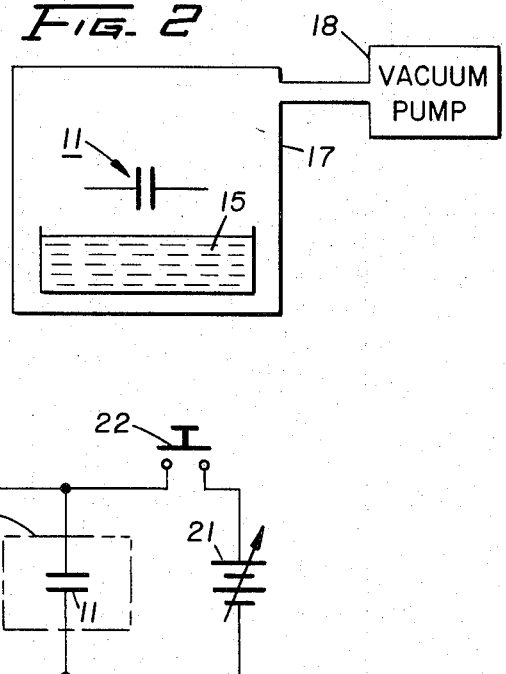
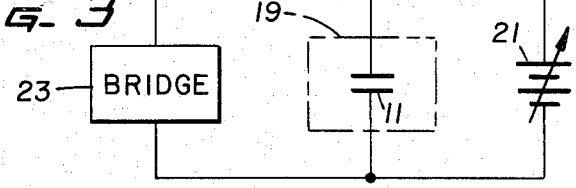
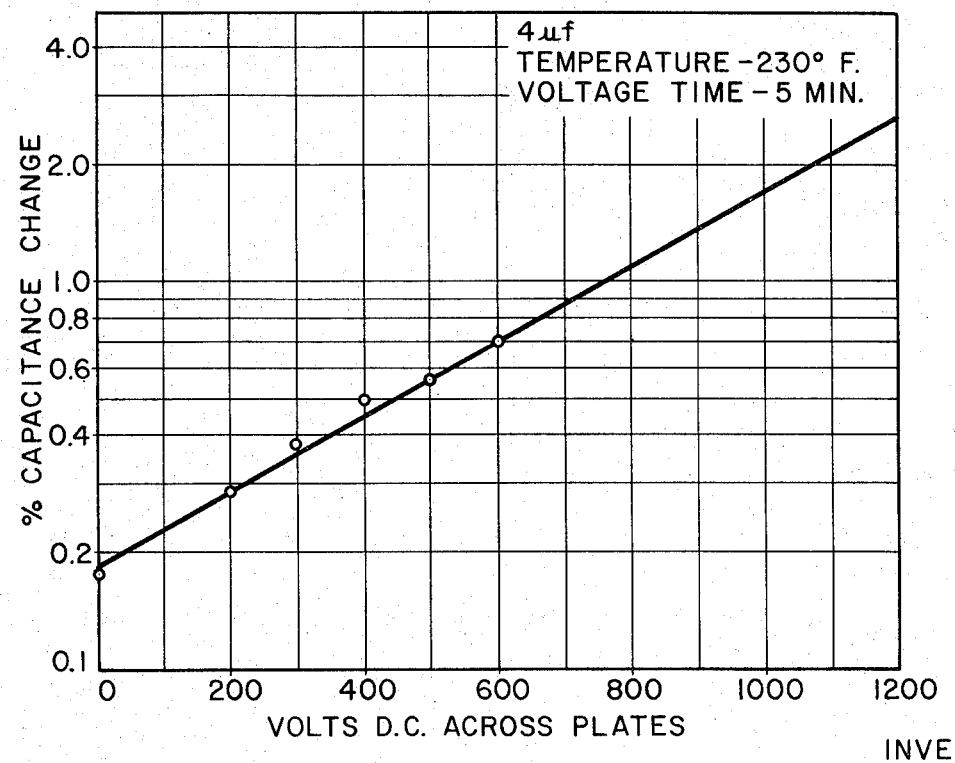
INVENTORS
D. R. BROWN
O. T. MASOPUST, Jr.
BY *Robert A. Lloyd*
ATTORNEY

United States Patent Office 3,715,786
Patented Feb. 13, 1973

---

3,715,786
METHODS AND APPARATUS FOR INCREASING THE CAPACITANCE VALUE OF A CAPACITOR
Donald R. Brown, Downers Grove, and Otto T. Masopust, Jr., Clarendon Hills, Ill., assignors to Western Electric Company, Incorporated, New York, N.Y.
Filed May 12, 1971, Ser. No. 142,466
Int. Cl. H01g 13/00
U.S. Cl. 29—25.42                     26 Claims

ABSTRACT OF THE DISCLOSURE

The capacitance value of a metallized film capacitor is increased by applying a voltage across the plates of the capacitor to generate an electrostatic attraction force therebetween to draw the metallized films closer together into a higher capacitance configuration. Heated wax is then impregnated into the space between the plates of the capacitor and allowed to cool to fix the plates in the higher capacitance configuration. The capacitance value of a metallized film, wax impregnated capacitor is increased by heating the capacitor to lower the viscosity of the wax therein, by applying a voltage across the plates of the capacitor to generate an electrostatic attraction force therebetween to draw the metallized films closer together through the heated wax into a higher capacitance configuration, and by cooling the capacitor to increase the viscosity of the wax therein to fix the plates in the higher capacitance configuration.

BACKGROUND OF THE INVENTION

(1) Field of the invention

The present invention relates to an apparatus for and method of adjusting the capacitance value of capacitors, and in particular to a method of adjusting the capacitance value of a metallized film, wax impregnated capacitor.

(2) Description of the prior art

A byproduct of the rapid expansion of various forms of electronic communication systems is a demand for improved efficiency in the use of available frequency spectra. This demand is reflected in part by increased efforts to achieve closer design tolerances in the production of frequency determining elements such as capacitors. Despite these efforts, batch production of high volume types of capacitors, such as metallized film, wax impregnated capacitors, has been heretofore limited to capacitance tolerances of approximately plus or minus 2%. In many applications requiring capacitors having a precise capacitance value, normal practice calls for selecting a pair of capacitors of the closest suitable magnitude and employing this selected pair in parallel to achieve the desired capacitance value. An alternative to this procedure is to test each capacitor in a finished batch, selecting only those few capacitors that conform to the standard design capacitance. Both of these procedures are obviously undesirable.

An object of the invention is to provide an apparatus for and a method of adjusting the capacitance value of a metallized film, wax impregnated capacitor, to a precise capacitance value.

A further object of the invention is to reduce the cost of mass producing a high quality, precision capacitor.

SUMMARY OF THE INVENTION

In accordance with the present invention, the capacitance value of a capacitor having a pair of spaced, electrically conductive plates is increased by first applying a voltage across the plates of the capacitor to generate an electrostatic attraction force therebetween to draw the plates of the capacitor closer together, whereby the capacitance value of the capacitor is increased, and by then impregnating a nonconductive substance into the space between the plates of the capacitor to maintain the plates spaced in the higher capacitance configuration. The capacitance value of a capacitor already having the nonconductive substance separating the plates thereof, the nonconductive substance exhibiting a decreasing viscosity in response to increased temperature, is increased by first applying a voltage across the plates of the capacitor to generate an electrostatic attraction force therebetween and by then heating the capacitor to lower the viscosity of the nonconductive substance. The electrostatic attraction force then draws the plates of the capacitor closer together to increase the capacitance value of the capacitor.

Preferably, the capacitor is a flat, metallized film capacitor. When the voltage is applied across the plates of the capacitor to generate an electrostatic attraction force therebetween to draw the plates of the capacitor closer together, the capacitance value of the capacitor is monitored to detect the increase in the capacitance value. When the monitored capacitance value reaches a predetermined value, a heated wax is impregnated into the space between the plates of the capacitor, the viscosity of the heated wax being sufficiently low to allow the wax to flow between the plates of the capacitor. Then the wax between the plates of the capacitor is cooled to increase the viscosity thereof to maintain the plates of the capacitor spaced in the higher capacitance configuration.

If the flat, metallized film capacitor already has wax separating the plates thereof, the capacitor is heated simultaneously with an application of a voltage across the plates thereof, to decrease the viscosity of the wax so that the plates are drawn together through the wax by the electrostatic force to increase the capacitance value of the capacitor. The capacitance value of the capacitor being heated is monitored during the heating step to detect the increase in the capacitance value. When the monitored capacitance value reaches a predetermined value, the capacitor is cooled to increase the viscosity of the wax therein to maintain the plates of the capacitor spaced in the higher capacitance configuration, the increased viscosity of the wax being sufficient to prevent the plates from being further drawn together by the electrostatic attraction force in response to the voltage applied thereto. The voltage is maintained across the plates of the capacitor during the cooling step to minimize and increase in the spacing between the plates before the viscosity of the wax increases sufficiently to maintain constant the spacing between the plates.

Other objects, advantages and features of the invention will be apparent upon consideration of the following detailed description when taken in conjunction with the appended drawings.

BRIEF DESCRIPTION OF THE DRAWINGS

FIG. 1 is a cross-sectional view of a metallized film capacitor;

FIG. 2 is a semidiagrammatic portrayal of apparatus for impregnating a wax between the plates of the capacitor;

FIG. 3 is a circuit and apparatus for practicing the method of the present invention; and FIG. 4 is a plot of a typical range of capacitance value change that occurs as a function of the potential applied across the plates of a metallized film, wax impregnated capacitor, while the capacitor is heated for a predetermined time at a constant temperature.

DETAILED DESCRIPTION

Referring to FIG. 1 of the drawings, there is shown a cross-sectional view of a completed, metallized film, wax impregnated capacitor 11, the capacitance value of which is to be increased in accordance with the first method of the present invention. The capacitor 11 is formed of two polyester metallized strips, such as polyester strips 12 and 13, sold in the trade under the name Mylar, each having a metallized film 14 and 16, respectively, carried thereon. The metallized films 14 and 16 are the plates of the capacitor and are comprised of a conductive material, such as zinc or aluminum, which has been deposited on one surface of each of the Mylar polyester strips 12 and 13. Spaced between the metallized strips 12 and 13 is a highly purified grade five microcrystalline wax 15.

The capacitor 11 is formed by placing the metallized strips 12 and 13 back-to-back, such that the metallized portion of each strip is separated from the metallized portion of the other strip by the polyester portions of the strips, and by winding a plurality of convolutions therefrom to form a tubular capacitor. The tubular capacitor is placed in a fixture which operates to both flatten and to securely hold the capacitor while each of the two ends thereof are solder sprayed to provide separate and porous electrical contacts with each of the metallized films 14 and 16.

At this point the capacitor 11 is unstable and pervious to moisture. To stabilize the capacitor and to render it impervious to moisture, the capacitor is placed in a vacuum chamber 17 which is then evacuated of atmosphere by a vacuum pump 18 to remove any air entrapped in the space between the convoluted metallized strips 12 and 13 of the capacitor. A highly purified grade five microcrystalline wax, which has been heated to a temperature of approximately 220° F. to lower the viscosity thereof, is then impregnated into the ends of the capacitor 11 to flow between the plates thereof and to fill any voids which exist between the metallized strips 12 and 13. The impregnation is accomplished by immersing the capacitor into a bath of the heated wax 15 placed within the vacuum chamber 17, and by then reintroducing air into the chamber so that the pressure produced forces the wax 15 through the porous solder blocks on each of the ends of the capacitor and into the voids. The capacitor 11 is then removed from the vacuum chamber 17 and cooled, increasing the viscosity of the wax therein, to fix the plates (the metallized films 14 and 16) of the capacitor in position to thereby stabilize the capacitance value of the capacitor and to seal the capacitor to render it impervious to moisture. Electrical leads are resistance soldered to the solder sprayed areas at the ends of the capacitor and the capacitor is tested to determine its capacitance value.

If the capacitance value of the capacitor 11 is lower than desired, the capacitance may be increased by operating upon the capacitor in accordance with the first method of the invention. As shown in FIG. 3, the capacitor 11 is placed within an oven 19 and means, such as a variable DC voltage source 21 and a switch 22, are connected to provide a potential across the plates of the capacitor 11. With the potential applied across the plates of the capacitor 11, the oven 19 is heated to a temperature of approximately 230° F.

The potential across the plates of the capacitor 11, applied by the voltage source 21 through the switch 22, generates an electrostatic attraction force between adjacent conductive metallized films 14 and 16 of the capacitor 11, which electrostatic attraction force may be expressed as $F=qE$, where F equals the electrostatic force between adjacent layers of the metallized film in newtons, $q$ equals the charge on the plates of the capacitor 11 in coulombs, and E equals the field intensity between the plates of the capacitor 11 in volts/meter. Since $q=CV$, where C equals the capacitance of the capacitor 11 in farads and V is the magnitude of the voltage across the plates of the capacitor, and since $E=V/d$, where $d$ is the distance between the plates of the capacitor in meters, substitution for $q$ and for E in the equation $F=qE$ gives $F=CV^2/d$. The electrostatic attraction force F, which is equal to $CV^2/d$, is a real physical force which, when the wax between the plates of the capacitor 11 has been heated to a lower viscosity, or liquid, state, draws the plates of the capacitor closer together to increase the capacitance thereof.

As the plates of the capacitor 11 are drawn closer together, the wax between the plates is extruded out of the ends of the capacitor. The capacitance value of the capacitor 11 is monitored during the above process by a bridge 23, and when the capacitance value of the capacitor increases to a predetermined value the oven 19 is turned off and cooler air is introduced therein to cool the capacitor and to solidify the wax therein to maintain the plates spaced in the new, higher capacitance, configuration.

Preferably, the voltage applied across the plates of the capacitor 11 is in excess of the rated breakdown voltage of the capacitor and is applied across the plates of the capacitor before the capacitor is heated to lower the viscosity of the wax therein. When the capacitor 11 is heated, a temperature gradient is generated within the capacitor, the wax near the outer areas of the capacitor achieving a lower viscosity prior to the wax near the center of the capacitor achieving a lower viscosity, so that the outer portions of the plates 14 and 16 of the capacitor 11 are pulled towards the yet solid center core of the capacitor. In this manner, a uniform decrease in the distance between the plates of the capacitor is achieved. If the capacitor 11 were first heated throughout and the voltage was then applied by the voltage source 21 and the switch 22 across the plates thereof, the voltage would generate an electrostatic attraction force which would tend to draw the areas of the plates 14 and 16 located near the center of the capacitor outward as well as to draw the areas of the plates 14 and 16 located near the periphery of the capacitor inward, thereby providing a nonuniform decrease in distance between the plates.

Also, when the monitored capacitance value reaches the predetermined value, the voltage provided by the voltage source 18 is preferably maintained across the plates of the capacitor while the capacitor is cooled. In this manner, any increase in spacing between the plates of the capacitor 11 as the capacitor is cooled, as a result of stress changes within the capacitor, which would tend to decrease the capacitance value of the capacitor, is minimized. When the capacitor 11 has cooled sufficiently so that the wax therein has increased in viscosity or has become solid, the voltage applied across the plates of the capacitor 11 is removed. The wax then maintains the plates spaced in their new, increased capacitance configuration, irrespective of a voltage potential subsequently applied thereacross. It is not essential, however, to maintain the voltage across the plates of the capacitor while cooling the capacitor to practice the method of the invention.

The percent increase in capacitance value of the capacitor 11 when the capacitor is operated upon in accordance with the above described method is dependent upon the amount of wax present between the plates of the capacitor, which determines the total possible decrease in distance between the plates of the capacitor, upon the magnitude of the voltage applied across the plates of the capacitor, which determines the attraction force between the plates of the capacitor, and upon the duration of the application of heat to the capacitor within the oven 19, which determines the total time available for the plates of the capacitor to move together. FIG. 4 shows the percentage increase in the capacitance value of a plurality of flat, four microfarad capacitors, in response to a different voltage being applied across the plates of each of the capacitors while the capacitor is heated in an oven at a temperature of 230° F. for a time interval of five minutes. It is seen that the percent increase in the capacitance value of the capacitor 11 increases approximately exponentially in response to increased voltages applied across the plates of the capacitor while heating the capacitor for five minutes. Such a result is a logical conclusion of the formula $F=CV^2/d$, since the electrostatic attraction force provided between the plates of the capacitor 11 is a function of the square of the voltage applied thereacross divided by the distance between the plates, with the change in distance between the plates being relatively small, and since the greater the electrostatic attraction force between the plates of the capacitor 11, the closer together the plates of the capacitor 11 are drawn after a predetermined time interval. Increases in capacitance of up to four percent have been obtained through the use of the above described material.

The capacitance value of the capacitor 11 may similarly be increased prior to impregnation of the heated wax 15 between the convoluted metallized strips 12 and 13 of the capacitor by employing the second method of the invention. In this case, after the two ends of the capacitor are solder sprayed to provide separate electrical contacts with each of the metallized films 14 and 16, the capacitance value of the capacitor is measured. If the capacitance value of the capacitor 11 is lower than desired, the capacitance may be increased to a predetermined value by applying a voltage from the DC voltage source 21, through the switch 22, across the plates 14 and 16 of the capacitor while simultaneously monitoring the capacitance value of the capacitor with the bridge 23.

The potential across the plates of the capacitor 11 generates, as described above, an electrostatic attraction force between adjacent conductive metallized films 14 and 16 of the capacitor, to draw the plates of the capacitor closer together to thereby increase the capacitance value of the capacitor. When the capacitance value of the capacitor 11 increases to the predetermined value as detected by the bridge 23, the potential provided by the voltage source 21 is removed from the plates of the capacitor to prevent a further increase in the capacitance value of the capacitor. The capacitance value of the capacitor 11 is then stabilized by impregnating the wax 15 between the metallized strips 12 and 13 in the manner heretofore described; that is, by placing the capacitor 11 in the vacuum chamber 17 which is then evacuated of atmosphere by the vacuum pump 18 to remove any air entrapped between the convoluted metallized strips 12 and 13, by immersing the capacitor in the bath of the heated wax 15 placed within the vacuum chamber 17, by introducing air into the chamber so that the pressure produced impregnates the heated wax 15 into the voids between the metallized strips 12 and 13, and by cooling the capacitor to increase the viscosity of the wax impregnated therein to fix the plates of the capacitor in the higher capacitance configuration.

After the wax 15 within the capacitor 11 has cooled to stabilize the capacitance value of the capacitor, a further additional increase in capacitance value may be obtained by operating upon the capacitor in accordance with the first described method of the invention. That is, a voltage is applied across the plates of the capacitor 11 by the voltage source 21 through the switch 22, the capacitor is heated to lower the viscosity of the wax therein while simultaneously monitoring the capacitance value of the capacitor with the bridge 23, and the capacitor is cooled, to increase the viscosity of the wax therein, after the capacitance value of the capacitor reaches a predetermined capacitance value as indicated by the bridge 23.

When the capacitance value of the capacitor 11 is increased by operating upon the capacitor in accordance with the second method of the invention, the percent increase in the capacitance value is dependent upon the amount of air present between the plates of the capacitor, which determines the total possible decrease in distance between the plates of the capacitor, upon the magnitude of the voltage applied across the plates of the capacitor, which determines the attraction force between the plates of the capacitor, and upon the time for which the voltage is applied across the plates of the capacitor, which determines the total time available for the plates of the capacitor to move together. In this manner, increases in capacitance value of over nine percent have been obtained.

While two particular embodiments of the invention have been described in detail, it is understood that various other modifications and embodiments may be devised by one skilled in the art without departing from the spirit and scope of the invention. For example, the change in the capacitance value of the wax impregnated capacitor 11 may be a function of time, wherein the capacitor 11, when being operated upon by the circuit of FIG. 3, is maintained within the oven 19 for varying time intervals with a predetermined constant potential being applied across the plates of the capacitor. Likewise, the method of the invention may be used on a tubular type capacitor; that is, a capacitor which has not been flattened within a fixture. However, in such a case the change in the capacitance value is not as uniform as is obtained with a flat capacitor, since the change in distance between the plates, which are circumferentially described around each other, is not as uniform as the change in distance between plates which are linearly imposed upon one another.

What is claimed is:

1. A method of increasing the capacitance value of a capacitor, the capacitor having a nonconductive substance separating the plates thereof, the nonconductive substance exhibiting a decreasing viscosity in response to increased temperature, which comprises:
   applying a voltage across the plates of the capacitor to generate an electrostatic attraction force therebetween; and
   heating the capacitor to lower the viscosity of the nonconductive substance, so that the electrostatic attraction force draws the plates of the capacitor closer together, whereby the capacitance value of the capacitor is increased.

2. The method as recited in claim 1, wherein the viscosity of the unheated, nonconductive substance is sufficient to maintain the plates of the capacitor in a spaced configuration, further comprising:
   cooling the capacitor to increase the viscosity of the substance to maintain the plates spaced in a higher capacitance configuration.

3. A method of increasing the capacitance value of a capacitor, the capacitor having a nonconductive substance separating the plates thereof, the nonconductive substance exhibiting a decreasing viscosity in response to increased temperature and having a viscosity, when unheated, sufficient to maintain the plates of the capacitor in a spaced configuration, which comprises:
   applying a voltage across the plates of the capacitor to generate an electrostatic attraction force therebetween;
   heating the capacitor to lower the viscosity of the nonconductive substance, so that the electrostatic force draws the plates of the capacitor together to decrease the distance between them, whereby the capacitance value of the capacitor is increased;
   monitoring the capacitance value of the capacitor being heated; and
   cooling the capacitor, when the monitored capacitance value equals a predetermined value, to increase the viscosity of the nonconductive substance to maintain the plates spaced in a higher capacitance configuration.

4. The method as recited in claim 3, wherein the voltage is maintained across the plates of the capacitor while the capacitor is cooled.

5. A method of increasing the capacitance value of a metallized film, wax impregnated capacitor, the wax separating the conductive plates thereof, which comprises:
   applying a voltage across the plates of the capacitor to generate an electrostatic attraction force therebetween; and heating the capacitor to decrease the viscosity of the wax, so that the electrostatic force draws the plates of the capacitor closer together, whereby the capacitance value of the capacitor is increased.

6. The method as recited in claim 5, further comprising the step of cooling the capacitor to increase the viscosity of the wax so that the plates are maintained spaced in a higher capacitance configuration.

7. The method as recited in claim 6, wherein the voltage is maintained across the plates of the capacitor during the cooling step.

8. A method of increasing the capacitance value of a flat, metallized film, wax impregnated capacitor, the wax separating the conductive plates thereof, which comprises:

applying a voltage across the plates of the capacitor to generate an electrostatic attraction force therebetween;

heating the capacitor to decrease the viscosity of the wax, so that the electrostatic force draws the plates of the capacitor closer together, whereby the capacitance value of the capacitor is increased;

monitoring the capacitance value while heating the capacitor; and cooling the capacitor, when the monitored capacitance value equals a predetermined value, to increase the viscosity of the wax so that the plates are maintained spaced in a higher capacitance configuration.

9. The method as recited in claim 8, wherein the voltage is maintained across the plates of the capacitor during the cooling step.

10. A method of increasing the capacitance value of a flat, metallized film, wax impregnated capacitor, the wax separating the conductive plates thereof, which comprises:

applying a voltage across the plates of the capacitor to generate an electrostatic attraction force therebetween, the viscosity of the wax being sufficient to prevent the plates from being drawn together by the electrostatic force;

heating the capacitor to decrease the viscosity of the wax, so that the plates are drawn together through the wax by the electrostatic force, whereby the capacitance value of the capacitor is increased;

monitoring the capacitance value while heating the capacitor, to detect the increase in the capacitance value; and cooling the capacitor, when the monitored capacitance value equals a predetermined value, to increase the viscosity of the wax so that the plates are maintained spaced in a higher capacitance configuration, the increased viscosity of the wax being sufficient to prevent the plates from being further drawn closer together by an electrostatic attraction force in response to a voltage applied thereto.

11. The method as recited in claim 10, wherein the voltage is maintained across the plates of the capacitor during the cooling step to minimize an increase in the spacing between the plates before the viscosity of the wax increases sufficiently to maintain the spacing between the plates.

12. Apparatus for increasing the capacitance value of a capacitor, the capacitor having a nonconductive substance separating the plates thereof, the nonconductive substance exhibiting a decreasing viscosity in response to increased temperature, which comprises:

means for applyng a voltage across the plates of the capacitor to generate an electrostatic attraction force therebetween; and means for heating the capacitor to lower the viscosity of the nonconductive substance, so that the electrostatic attraction force draws the plates of the capacitor closer together, whereby the capacitance value of the capacitor is increased.

13. Apparatus for increasing the capacitance value of a capacitor, the capacitor having a nonconductive substance separating the plates thereof, the nonconductive substance exhibiting a decreasing viscosity in response to increased temperature and having a viscosity, when unheated, sufficient to maintain the plates of the capacitor in a spaced configuration, which comprises:

means for applying a voltage across the plates of the capacitor to generate an electrostatic attraction force therebetween;

means for heating the capacitor to lower the viscosity of the nonconductive substance, so that the electrostatic force draws the plates of the capacitor together to decrease the distance between them, whereby the capacitance value of the capacitor is increased;

means for monitoring the capacitance value of the capacitor being heated; and means for cooling the capacitor, when the monitored capacitance value equals a predetermined value, to increase the viscosity of the nonconductive substance to maintain the plates spaced in a higher capacitance configuration.

14. A method of increasing the capacitance value of a capacitor having spaced, electrically conductive plates that are movable with respect to each other, which comprises:

applying a voltage across the plates of the capacitor to generate an electrostatic attraction force therebetween to draw the plates of the capacitor closer together, whereby the capacitance value of the capacitor is increased; and impregnating a nonconductive substance into the space between the plates of the capacitor to maintain the plates spaced in the higher capacitance configuration.

15. The method as recited in claim 14, wherein the voltage applied across the plates of the capacitor is removed prior to the impregnating step.

16. The method as recited in claim 15, further comprising:

monitoring the capacitance value of the capacitor while applying the voltage across the plates thereof; and removing the voltage across the plates when the monitored capacitance value equals a predetermined value.

17. The method as recited in claim 14, further comprising:

monitoring the capacitance value of the capacitor while applying the voltage across the plates thereof; and impregnating the substance into the space between the plates of the capacitor after the monitored capacitance value equals a predetermined value.

18. The method as recited in claim 17, wherein the impregnating step comprises:

impregnating a heated wax into the space between the plates of the capacitor, the viscosity of the heated wax being sufficiently low to allow the wax to flow between the plates of the capacitor; and cooling the wax between the plates of the capacitor to increase the viscosity thereof, the viscosity of the cooled wax being sufficient to maintain the plates of the capacitor in a spaced configuration.

19. A method of increasing the capacitance value of a flat, metallized film capacitor having spaced plates that are movable with respect to each other, which comprises:

applying a voltage across the plates of the capacitor to generate an electrostatic force therebetween to draw the plates of the capacitor closer together, whereby the capacitance value of the capacitor is increased;

monitoring the capacitance value of the capacitor while applying the voltage across the plates thereof;

impregnating a heated wax into the space between the plates of the capacitor after the monitored capacitance value equals a predetermined value, the viscosity of the heated wax being sufficiently low to allow the wax to flow between the plates of the capacitor; and cooling the wax between the plates of the capacitor to increase the viscosity thereof, the viscosity of the cooled wax being sufficient to maintain the plates of the capacitor in a spaced configuration.

20. The method as recited in claim 19, wherein the voltage applied across the plates of the capacitor is removed prior to the impregnating step.

21. Apparatus for increasing the capacitance value of a capacitor having spaced, electrically conductive plates that are movable with respect to each other, which comprises:

means for applying a voltage across the plates of the capacitor to generate an electrostatic attraction force therebetween to draw the plates of the capacitor closer together, whereby the capacitance value of the capacitor is increased; and means for impregnating a nonconductive substance into the space between the plates of the capacitor to maintain the plates spaced in the higher capacitance configuration.

22. Apparatus as recited in claim 21, further comprising:

means for monitoring the capacitance value of the capacitor while applying the voltage across the plates thereof; and means for removing the voltage across the plates of the capacitor when the monitored capacitance value equals a predetermined value.

23. Apparatus as recited in claim 22, wherein the impregnating means comprises:

means for impregnating a heated wax into the space between the plates of the capacitor, the viscosity of the heated wax being sufficiently low to allow the wax to flow between the plates of the capacitor; and means for cooling the wax between the plates of the capacitor to increase the viscosity thereof, the viscosity of the cooled wax being sufficient to maintain the plates of the capacitor in a spaced configuration.

24. A method of increasing the capacitance value of a capacitor having spaced, electrically conductive plates that are movable with respect to each other, which comprises:

applying a voltage across the plates of the capacitor to generate an electrostatic attraction force therebetween to draw the plates of the capacitor closer together, whereby the capacitance value of the capacitor is increased;

monitoring the capacitance value of the capacitor while applying the voltage across the plates thereof;

impregnating a heated, nonconductive substance into the space between the plates of the capacitor after the monitored capacitance value equals a first predetermined value, the viscosity of the heated substance being sufficiently low to allow it to flow between the plates of the capacitor;

cooling the heated substance between the plates of the capacitor to increase the viscosity thereof, the viscosity of the cooled substance being sufficient to maintain the plates of the capacitor in a spaced configuration; and measuring the capacitance value of the cooled capacitor and, if the capacitance value is below a second predetermined capacitance value, performing the following steps:

(a) applying a voltage across the plates of the capacitor to generate an electrostatic attraction force therebetween;

(b) heating the capacitor to lower the viscosity of the substance between the plates of the capacitor, so that the plates are further drawn together through the substance, whereby the capacitance value of the capacitor is further increased;

(c) monitoring the capacitance value of the capacitor while heating the capacitor, to detect the increase in capacitance value; and (d) cooling the capacitor when the monitored capacitance value equals a third predetermined value, to increase the viscosity of the substance, so that the plates are maintained spaced in a higher capacitance configuration, the increased viscosity of the substance being sufficient to prevent the plates from being further drawn closer together by an electrostatic attraction force in response to a voltage applied thereto.

25. The method as recited in claim 24, wherein the nonconductive substance is wax.

26. A method of adjusting the capacitance value of a capacitor having a pair of spaced plates that are movable with respect to each other, the capacitor initially having a first capacitance value in response to the plates having a first spacing with respect to each other, which comprises:

applying charges to the plates to generate electrostatic forces to move the plates, relative to each other, to a second spacing with respect to each other to change the capacitance of the capacitor to a second value; and thereafter setting a dielectric material positioned between the plates to maintain the plates in the second spaced position.

References Cited

UNITED STATES PATENTS

| | | | |
|---|---|---|---|
| 3,221,227 | 11/1965 | Devaney | 317—260 X |
| 3,274,663 | 9/1966 | Bonenfant et al. | 29—25.42 |
| 1,666,922 | 4/1928 | Wiggins | 317—261 |
| 3,545,059 | 12/1970 | Masland et al. | 29—25.42 |

CHARLES W. LANHAM, Primary Examiner

C. E. HALL, Assistant Examiner

U.S. Cl. X.R.

264—22; 317—249 R, 260, 261